_United States Patent Office_

3,642,914
Patented Feb. 15, 1972

3,642,914
PREPARATION OF BETA BRANCHED PRIMARY ALCOHOLS
Lawrence C. Mitchell, Southfield, Mich., assignor to Ethyl Corporation, New York, N.Y.
No Drawing. Filed Mar. 18, 1968, Ser. No. 714,073
Int. Cl. C07c 31/02
U.S. Cl. 260—642                                                4 Claims

ABSTRACT OF THE DISCLOSURE

Straight-chain, paraffinic, primary alcohols (such as n-dodecanol) dimerize to form β-branched, primary alcohols, when contacted with a catalytic quantity of the thermal decomposition product of sodium bisulfite.

BACKGROUND OF THE INVENTION

It is known that linear alcohols form branched alcohols when contacted with a catalytic quantity of an alkali metal. This is known as the Guerbet reaction; Krauch et al., Organic Name Reactions, John Wiley and Sons, New York, N.Y. (1964), p. 203. A path for this reaction has been suggested; Pratt et al., J. Am. Chem. Soc. 76, 52 (1954).

SUMMARY OF THE INVENTION

I have discovered that the decomposition product obtained by heating $NaHSO_3$ also catalyzes the formation of branched form linear alcohols. This is illustrated by the following reaction equation for n-dodecanol. In the equation [cat] stands for the residual product obtained by heating $NaHSO_3$.

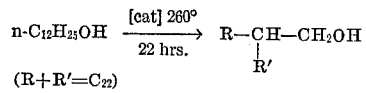

$$\text{n-}C_{12}H_{25}OH \xrightarrow[22 \text{ hrs.}]{[\text{cat}] \ 260°} R-\underset{\underset{R'}{|}}{C}H-CH_2OH$$

$(R+R'=C_{22})$

In essence, my invention can be depicted by a preferred embodiment which is a process for preparing a β-branched, primary alcohol, said process comprising dimerizing a straight-chain, paraffinic, primary alcohol having up to about sixteen carbon atoms; said process being conducted by contacting said straight-chain alcohol with a catalyst, said catalyst being the decomposition product obtained by heating $NaHSO_3$ at a temperature of from 150° to 300° C., said process being carried out at a temperature of from 150° to 350° C. for a time sufficient for said β-branched alcohol to be formed; the mole ratio of said straight-chain alcohol to said catalyst being from 3 to 1 to 100 to 1. As illustrated by the above equation, I use the term β-branched to signify an alcohol having a branch on the carbon atom adjacent to the carbon atom in the carbinol group.

Branched alcohols are widely used intermediates. They are used in forming fuel and lube additives, the branched structure conferring enhanced solubility. In short, many of the alcohols produced by my process are known compounds, and they have the many utilities known for them.

In some instances my process forms (by-product) paraffins. These paraffins have $2n-1$ carbons (where the number of carbon atoms in the starting alcohol is $n$). These paraffins are useful; for example, they may be dehydrogenated to form olefins; Kestutis A. Keblys, U.S. 3,293,318 and John M. McEuen, U.S. 3,322,849. The olefins may be subjected to ozonolysis-yielding acids, L. C. Mitchell, U.S. 3,362,971.

Furthermore, in some instances, my process forms by-product sulfides. Thus, I have isolated $(n-C_{12}H_{25})_2S$ when n-dodecanol is subjected to my process. Sulfides such as these are known and have the many utilities known for them.

DESCRIPTION OF PREFERRED EMBODIMENTS

The alcohols used as starting materials in this process have the general formula $$C_nH_{2n+1}OH$$

I prefer to use straight-chain, paraffinic, primary alcohols having up to about 16 carbon atoms because these are readily available. However, there is no known size limitation. Thus, alcohols having 18, 20 or more carbon atoms can be employed.

The preferred alcohols are illustrated by the following non-limiting examples; ethanol, n-hexanol, n-heptanol, n-octanol, n-dodecanol, n-hexadecanol, and the like. Preferably, the alcohol has at least 4 carbon atoms. Two highly preferred alcohols are n-butanol and n-dodecanol.

The starting alcohol need not be pure. Mixtures of alcohols can be employed as starting materials. Thus, this process can be carried out using alcohol mixtures formed by Ziegler chain growth reactions employing olefin feeds such as ethylene.

As mentioned above, the catalyst used in the process of this invention is formed by heating sodium bisulfite. The catalyst, to a large extent, consists of sodium sulfite, probably formed by the following reaction sequence:

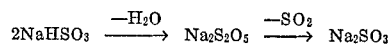

$$2NaHSO_3 \xrightarrow{-H_2O} Na_2S_2O_5 \xrightarrow{-SO_2} Na_2SO_3$$

However, the exact composition of the catalyst is not known. In this regard, it is well to mention that a purchased sample of reagent grade sodium sulfite is much less reactive than a catalyst formed by decomposition of sodium bisulfite.

The catalyst can be formed in situ; in other words, it can be formed by decomposing the parent sulfite in the presence of the alcohol to be dimerized. The catalyst formation is conveniently conducted at atmospheric pressure and at a temperature sufficient to form the catalyst. In general, the catalyst is prepared by heating it at temperatures of 125° to about 400° C. and preferably at a temperature from 150° to about 300° C. The catalyst formation is usually conducted over a period of from 0.5 to about 4 hours, and preferably by heating for 0.5 to 2 hours. Significantly, the catalyst can be reused as illustrated by an example which follows.

The alkali metals are considered substantially equivalent in many instances. This suggests that other alkali metal bisulfites such as lithium bisulfite and potassium bisulfite can be thermally decomposed to yield catalysts active in the process of this invention.

For purposes of this invention, a mole of catalyst is defined as the amount of catalyst formed by decomposition of one mole of parent bisulfite. As far as the amount of catalyst employed is concerned, it is only necessary to use a catalytic quantity, that is, an amount sufficient to generate a reasonable amount of dimer product in a reasonable reaction time. In general, from 2 to 200 moles of starting alcohol are used for each mole of catalyst. A preferred range of alcohol to catalyst is from 3 to 1 to 100 to 1.

The reaction temperature is not critical. It is only necessary to use a temperature which affords a reasonable amount of desired product within a reasonable reaction time. In general, temperatures within the range of 125 to 400° C. are employed. A preferred temperature range is from 150 to 350° C.

The reaction pressure is not critical. In many instances, the reaction is conveniently carried out at atmospheric pressure. However, greater or lesser pressures can be used. Thus, the process can be conducted at superatmospheric pressures, say, to about 1000 atmospheres or higher. Such pressures can be employed when it is desired to conduct the reaction at a temperature above the normal boiling point of the starting alcohol.

I believe that the reaction course is enhanced by removal of water from the reaction system. This is conveniently done at atmospheric pressures by equipping the reaction vessel with a Dean-Stark trap or similar device. When conducting the reaction in an autoclave under superatmospheric pressure, water can be removed by continuous purging of the reaction zone with a gas such as nitrogen or argon. When using this technique, the gas is bled into the autoclave at a pressure slightly above the pressure within the reaction vessel, accompanied with simultaneous venting of effluent gas. In many instances, it is best to introduce the gas stream below the liquid level in the autoclave.

The reaction time is not a truly independent variable since it is somewhat dependent on such parameters as temperature, pressure, inherent reactivity of the starting alcohol and catalyst, etc. I have noted in a reaction conducted by forming the catalyst in situ that the formation of dimer product is subsequent to formation of the catalyst and that very little product was formed when the reaction was conducted for only an hour's reflux after the catalyst was formed. (This is illustrated in an example following.) Consequently I prefer reaction times of from about 4 to about 48 hours, 18–22 hours usually being sufficient.

The reaction can be conducted by merely contacting the catalyst and the alcohol to be dimerized. Alternatively, it can be conducted by contacting the catalyst-alcohol mixture in the presence of other materials which are essentially inert to the reactant, product and catalyst. Thus, if desired, the reaction can be conducted in the presence of a reaction medium such as a solvent. Typical solvents which can be employed are paraffins, ethers, halogenated paraffins, amides and sulfones.

The following examples serve to illustrate the process of this invention but do not limit it.

EXAMPLE I

Reaction of 1-dodecanol with sodium bisulfite

A 200 ml. round-bottom flask was charged with 100 ml. of 1-dodecanol and 20 g. of sodium bisulfite. The flask was equipped with a Dean-Stark trap and reflux condenser. The mixture was heated to reflux under nitrogen. During heating bumping occurred as water distilled over along with a yellow solid that deposited on the condenser. As refluxing progressed it settled down and no more solid came over. After 22 hours the reaction mixture was cooled.

The mixture was filtered and the collected solid catalyst washed well with ether. The solid catalyst was dried in an evacuated desiccator; weight, 15.96 g. It was identified by IR and its X-ray powder pattern as mainly sodium sulfite. Theory for sodium sulfite is only 12.1 g. The IR showed it contained some organic material also.

The filtrate was stripped of ether; weight, 66.9 g. A 63.3 g. portion was distilled through a short Vigreaux.

| Fraction Number | Boiling point, mm. | Weight, g. |
|---|---|---|
| 1 | 85–89°/0.25 | 27.4 |
| 2 | 90–163°/0.2 | 1.6 |
| 3 | 163–179°/0.2 | 12.5 |
| 4 | 178–180°/0.2 | 4.5 |
| 5 | 180°/0.2 | 9.8 |
| Residue | | 6.9 |
| Total | | 62.7 |

Fraction 1 was identified as 1-dodecanol by infrared analysis. Fractions 2 and 3 consisted of by-products. Fractions 4 and 5 were essentially 2-component mixtures with small amounts of impurities.

The two main components in Fraction 4 were separated by dissolving 1.0 ml. of the mixture in 10 ml. of methanol, cooling in a refrigerator, filtering the crystals, washing them with methanol and drying them in vacuo. The small amount of crystals isolated were identified as dodecyl-sulfide by IR, NMR and mass spec.: infrared (KBr): only C–H adsorptions; NMR (CCl$_4$): 7.6$\tau$ [Tau] (triplet, 4 H), 8.7$\tau$ (~40 H), 9.1$\tau$ (triplet, 6 H); mass spec: $m/e=370$ (parent peak).

The filtrate from above was evaporated under a stream of nitrogen. The residue was identified as a $\beta$-branched-chain C$_{24}$ saturated primary alcohol by IR, NMR and Mass spec: infrared (film), 3200 and 1170 cm.$^{-1}$; NMR (CCl$_4$): 6.6$\tau$ (broad singlet (actually unresolved doublet), 2 H), 7.2$\tau$ (singlet, 1 H, disappears on deuteration), 8.7$\tau$ (~41 H), 9.1$\tau$ (triplet, 6 H); mass spec: $m/e=354$ (parent peak, proved by silanizing with Sil-Prep).

EXAMPLE II

Reaction of dodecanol with sodium metabisulfite

In a 300 ml. round bottom flask was placed 100 ml. (83 g. 0.45 mole) of freshly distilled 1-dodecanol and 18 g. (0.095 mole) of sodium metabisulfite. The flask was equipped with a Dean-Stark trap and reflux condenser.

The mixture was heated under nitrogen. Soon gas was evolved. After awhile the gas evolution stopped and a little gas adsorption occurred. Then a yellow solid and a little water began distilling. Eventually the alcohol refluxed and water distillation stopped. The mixture was refluxed for an hour and cooled.

The mixture in the Dean-Stark trap, weight 11.6 g., consisted of water (~1 ml.) and dodecanol plus minor impurities (VPC).

The reaction mixture was filtered. The collected solid was washed with ether and dried in vacuo; weight, 15.6 g. Infrared and X-ray analysis indicated the solid was mainly sodium sulfite containing a little organic material and amorphous material.

The filtrate plus washings was stripped on a rotary evaporator to remove the ether; weight, 66.5 g. VPC analysis showed it was mainly dodecanol plus some higher boiling components. However, the amount of high-boilers was much less than the previous example.

EXAMPLE III

Reaction of dodecanol with recovered sodium sulfite 1 100 ml. round bottom flask was charged with 50 ml. (41 g., 0.22 mole) of distilled 1-dodecanol and 8 g. (~.06 mole) of impure sodium sulfite recovered from Example I. The flask was equipped with a magnetic stirrer, Dean-Stark trap and reflux condenser. The stirred mixture was refluxed for 22 hours under nitrogen and cooled to room temperature.

The Dean-Stark trap contained water (~1 ml.) plus organic liquid and a little white solid; total weight, 11.33 g. The organic liquid was mainly dodecanol (VPC) with one other component of lesser retention time.

The reaction mixture was filtered. The collected solid was washed with ether and dried in vacuo; weight, 7.39 g. Its IR spectrum was essentially the same as the starting solid.

The filtrate plus washings was stripped of ether; weight, 28.8 g. A 20 g. portion was distilled through a spinning-band column.

| Cut Number | Bath temp., degrees | O'h'd temp., degrees | Pressure mm. | Weight, g. | Remarks |
|---|---|---|---|---|---|
| 1 | 120–160 | 60–94 | 0.5 | 2.66 | |
| 2 | 147–161 | 94 | 0.5 | 7.79 | |
| 3 | 161–247 | 100–156 | 0.5 | 3.47 | Solidifies partly on standing. |
| 4 | 258–270 | 156–167 | .5 | 3.86 | |
| Residue | | | | 1.78 | Contains some silicone grease. |

Cut No. 3 was filtered to give 2.83 g. of filtrate. The collected solid was dissolved in pet. ether for VPC. VPC's were run on all the distillation cuts. Cut Nos. 1 and 2 consisted mainly of dodecanol-1. The major portion of the liquid from Cut No. 3 contained the same alcohol. The solid from Cut No. 3 had one major component which was identified as n-tricosane by recrystallization from ethanol and IR, NMR and mass spectrographic analysis. Cut No. 4 contained one major component which was the same $C_{24}$ branched primary alcohol isolated in Example I.

Following the same procedure, the same alcohol is obtained by conducting the reaction at temperatures of 200° and 300° C. In a similar manner, n-butanol, n-hexanol, n-dodecanol, and n-hexadecanol are dimerized to form analogous products at temperatures of from 150° to 300° C. These reactions are carried out using starting alcohol-catalyst ratios of from 3 to 1 to 100 to 1.

EXAMPLE IV

Following the procedure of Example III, 100 ml. of dodecanol-1 and 12.0 grams of chemically pure sodium sulfite were contacted. The reaction mixture yielded very little product.

Having fully described this invention and its utilities it is desired that the invention be solely limited by the lawful scope of the appended claims.

What is claimed is:
1. A process for preparing a β-branched primary alcohol contacting comprising contacting sodium bisulfite with a straight-chain, paraffinic primary alcohol having up to about 16 carbon atoms and heating the resultant mixture to 150° to 300° C. in an inert atmosphere; the mole ratio of said straight-chain alcohol to said bisulfite being from 3 to 1 to 100 to 1.
2. The process of claim 1 wherein said straight-chain alcohol is n-docecanol.
3. The process of claim 2 wherein the mole ratio of said straight-chain alcohol to said catalyst is about 5 to 1.
4. The process of claim 1 wherein said straight-chain alcohol is n-butanol.

References Cited
UNITED STATES PATENTS

| | | | |
|---|---|---|---|
| 2,457,866 | 1/1949 | Carter | 260—642 |
| 2,762,847 | 9/1956 | Miller et al. | 260—642 |
| 2,862,013 | 11/1958 | Miller et al. | 260—642 |
| 3,119,880 | 1/1964 | Kollar et al. | 260—642 |
| 3,328,470 | 6/1967 | Poe | 260—642 |

BERNARD HELFIN, Primary Examiner

J. E. EVANS, Assistant Examiner

U.S. Cl. X.R.

252—439; 260—583 R, 609 A, 676 R, 681

PO-1050
(5/69)

UNITED STATES PATENT OFFICE
CERTIFICATE OF CORRECTION

Patent No. 3,642,914      Dated February 15, 1972

Inventor(s) Lawrence C. Mitchell

It is certified that error appears in the above-identified patent and that said Letters Patent are hereby corrected as shown below:

Column 6, line 5, "contacting" (both occurrences) should be deleted and -- admixing -- substituted for the second occurrence of "contacting"

Signed and sealed this 13th day of June 1972.

(SEAL)
Attest:

EDWARD M. FLETCHER, JR.
Attesting Officer

ROBERT GOTTSCHALK
Commissioner of Patents